United States Patent
Kweon

(10) Patent No.: US 9,862,838 B2
(45) Date of Patent: Jan. 9, 2018

(54) METHOD FOR PREPARING ORGANIC-INORGANIC HYBRID POROUS INSULATION COATING COMPOSITION

(71) Applicant: HYUNDAI MOTOR COMPANY, Seoul (KR)

(72) Inventor: Kyoung Chun Kweon, Seoul (KR)

(73) Assignee: HYUNDAI MOTOR COMPANY, Seoul (KR)

( * ) Notice: Subject to any disclaimer, the term of this patent is extended or adjusted under 35 U.S.C. 154(b) by 0 days.

(21) Appl. No.: 15/350,454

(22) Filed: Nov. 14, 2016

(65) Prior Publication Data

US 2017/0166758 A1   Jun. 15, 2017

(30) Foreign Application Priority Data

Dec. 15, 2015 (KR) .................. 10-2015-0179500

(51) Int. Cl.
| | | |
|---|---|---|
| *C09D 5/18* | (2006.01) | |
| *C09D 7/12* | (2006.01) | |
| *C09D 177/00* | (2006.01) | |
| *C09C 1/28* | (2006.01) | |
| *C09D 5/00* | (2006.01) | |
| *C08K 9/02* | (2006.01) | |
| *C08K 9/04* | (2006.01) | |
| *C08K 9/06* | (2006.01) | |

(52) U.S. Cl.
CPC .................. *C09D 5/18* (2013.01); *C09C 1/28* (2013.01); *C09D 5/00* (2013.01); *C09D 7/1266* (2013.01); *C09D 7/1275* (2013.01); *C09D 177/00* (2013.01); *C08K 9/02* (2013.01); *C08K 9/04* (2013.01); *C08K 9/06* (2013.01); *C08K 2201/011* (2013.01)

(58) Field of Classification Search
CPC ...... C09D 5/18; C09D 7/1266; C09D 7/1275; C09D 177/00; C09C 1/28
See application file for complete search history.

(56) References Cited

FOREIGN PATENT DOCUMENTS

| | | | | |
|---|---|---|---|---|
| JP | 2006-136168 A | 5/2006 | | |
| JP | 2008-248042 A | 10/2008 | | |
| JP | 2008-257925 A | 10/2008 | | |
| JP | 2013-532764 A | 8/2013 | | |
| KR | 10-2011-0014383 | * | 2/2011 | .............. C08L 83/04 |
| KR | 10-1104390 B1 | 1/2012 | | |
| WO | WO 2012/018422 A1 | * | 2/2012 | ............... C08K 3/34 |

* cited by examiner

*Primary Examiner* — Robert Harlan
(74) *Attorney, Agent, or Firm* — McDermott Will & Emery LLP

(57) ABSTRACT

A method for preparing an organic-inorganic hybrid porous insulation coating composition includes steps of: adding sepiolite nanoparticles that have been surface-treated with silane or dimethyl ammonium chloride to a thermal-resistant resin solution; and stirring the thermal-resistant resolution solution containing the sepiolite nanoparticles at 3600 rpm or more for 30 minutes or more. The thermal-resistant resin solution includes at least one thermal-resistant resin selected from the group consisting of polyamide-imide, polyester, polyester-imide and polyamic acid.

5 Claims, 5 Drawing Sheets

[Method for manufacturing organic/inorganic enamelled
winding wires according to related art]

PAI                PAI + Sepiolite 0.5 wt%

METHOD FOR PREPARING ORGANIC-INORGANIC HYBRID POROUS INSULATION COATING COMPOSITION

CROSS-REFERENCE TO RELATED APPLICATION

This application claims the benefit of priority to Korean Patent Application No. 10-2015-0179500, filed in the Korean Intellectual Property Office on Dec. 15, 2015, the entirety of which is incorporated herein by reference.

TECHNICAL FIELD

The present disclosure relates to a technology for preparing a coating film for winding wires used in a motor/alternator, etc., and more particularly, a method for preparing an organic-inorganic hybrid porous insulation coating composition having nano effects.

BACKGROUND

Enameled winding wires consist of a copper (Cu) conductor and a polymer coating. In the enameled winding wire industry, there has been ongoing research into high durability/high insulation coating film materials capable of securing high insulation even at a high current while increasing coating adhesiveness with copper for processing, flexibility and abrasion resistance. In addition, as the output of a motor/alternator is increased, enameled winding wires are required to have high thermal resistance, such that they are able to withstand high temperature without damage. In accordance with the recent trend toward increased output and decreased weight of the motor/alternator, research has been undertaken into a technology of enameled winding wires capable of having increased and improved functionality.

Polyester or polyester-imide, which have lower thermal resistance but have higher coating adhesiveness and flexibility, is primarily used as a primary coating layer for adhesiveness with the copper conductor, and polyamide-imide, which has higher insulation and higher thermal resistance, is coated as a secondary coating layer. Depending on the requirements for components used in particular application fields, tertiary coatings may be additionally included to increase abrasion resistance or chemical resistance or to provide a low friction characteristic. Breakdown voltage, which is an important characteristic, improves as thickness is increased. However, since the thickness of the coating film is increased as coating is performed in a multilayer structure, an amount of wires wound around a slot of limited coils is reduced. The amount is expressed by a space factor (%), and as the space factor is increased, it is possible to achieve higher density of a current, thereby allowing for miniaturization and higher power of the motor/alternator. There is continuous increased demand for smaller size and higher power of the motor/alternator. Furthermore, when the thickness of the coating film is increased, manufacturing processes increase in complexity, which also increases the cost.

In particular, it is important for a drive motor for an environmental vehicle to have surge resistance. In order to improve the surge resistance, silicon particles are added to an enameled organic material, thereby improving both the insulation and the surge resistance. However, the addition of inorganic materials to the organic materials reduces the dispersibility of the inorganic materials, and a close contacting property between the enameled coating film and the copper conductor are deteriorated, along with the flexibility, such that coating film breakage may occur when the winding wires are processed. To solve these problems, a primary coating for improving the coating adhesiveness, a secondary coating including inorganic materials, and tertiary coating may be incorporated. In addition, a thickness of coating can be thickened to increase breakdown voltage.

As an example, Korean Registration Patent No. 10-1104390 discloses a coating film in which silicas having shapes of spherical, plate-shaped, etc., are added in polyamide-imide (PAI) and dispersed, and coated on copper, wherein when the silica is added in a content of 12.5 wt %, the breakdown voltage is merely increased by about 20% as compared to a case when a silica content is 0 wt %. In addition, a thickness of the coating film is the maximum of 53 μm, which is significantly thick. It is not possible to increase the breakdown voltage while simultaneously reducing the thickness of the coating film. When the silica content is further increased, the breakdown voltage is rather decreased. The reason is that even though the spherical and plate-shaped ceramic have a nanometer size, there is a limitation in increasing a surface area, such that it is difficult to secure binding force with organic materials. When the thickness of the coating film is increased or an added content of silica is increased in order to increase an insulation effect, it is difficult to control the viscosity of the organic materials, and the production cost may be significantly increased. Even though the added content of silica is increased, an agglomeration phenomenon among ceramics is intensified, and binding force in the organic materials is reduced, which may cause a reduction in the breakdown voltage.

Therefore, there has been ongoing research into the development of a coating material capable of securing improved breakdown voltage performance while simultaneously having a thin coating film at the time of manufacturing enameled winding wires used in the motor and the alternator.

The above information disclosed in this Background section is only for enhancement of understanding of the background of the disclosure and therefore it may contain information that does not form the prior art that is already known in this country to a person of ordinary skill in the art.

SUMMARY

The present disclosure has been made in an effort to provide a method for preparing an organic-inorganic hybrid porous insulation coating composition having advantages of forming a coating film having a thin thickness and high breakdown voltage at the time of manufacturing enameled winding wires by high-speed dispersing a surface-treated porous sepiolite in an organic coating composition used in a motor and an alternator.

It is an aspect of the present disclosure to provide a method for preparing an organic-inorganic hybrid porous insulation coating composition comprising: adding sepiolite nanoparticles that have been surface-treated with silane or dimethyl ammonium chloride to a thermal-resistant resin solution, and stirring the thermal-resistant resin solution containing the sepiolite nanoparticles at 3600 rpm or more for 30 minutes or more, wherein the thermal-resistant resin solution includes at least one thermal-resistant resin selected from the group consisting of polyamide-imide, polyester, polyester-imide and polyamic acid.

It is another aspect of the present invention to provide a method of adding the sepiolite nanoparticles in a content of 0.1 to 5 wt %, based on the weight of a solid content included in the solution.

It is still another aspect of the present invention to provide a method of adding the sepiolite nanoparticle having a specific surface area of 230 to 380 m²/g.

It is still another aspect of the present invention to provide a method of adding the sepiolite nanoparticle having a size of 50 to 500 nm.

It is still another aspect of the present invention to provide a method of adding the sepiolite nanoparticles in the thermal-resistant resin solution, which includes the thermal-resistant resin in a content of 15 to 45 wt %, based on a total weight of the thermal-resistant resin solution.

It is still another aspect of the present invention to provide a method of adding the sepiolite nanoparticles in the thermal-resistant resin solution, which includes at least one organic solvent selected from the group consisting of N-methylpyrrolidone (NMP) dimethyl formamide (DMF), dimethylacetamide (DMAc), cellusolves, glycols, and ketones.

DETAILED DESCRIPTION OF THE EMBODIMENTS

Figure 1:
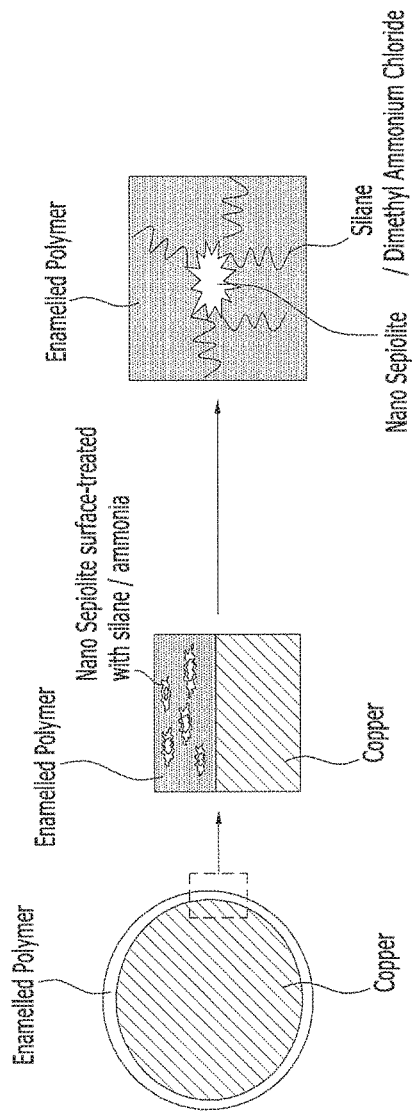
FIG. 1 is a schematic view showing a constitution of an organic/inorganic hybrid coating film including a nanoporous insulator.

An exemplary embodiment in the present disclosure provides a method for preparing an organic-inorganic hybrid porous insulation coating composition comprising: adding sepiolite nanoparticles that have been surface-treated with silane or dimethyl ammonium chloride to a thermal-resistant resin solution, stirring the thermal-resistant resin solution containing the sepiolite nanoparticles at 3600 rpm or more for 30 minutes or more, wherein the thermal-resistant resin solution includes at least one thermal-resistant resin selected from the group consisting of polyamide-imide, polyester, polyester-imide and polyamic acid.

Hereinafter, a method for preparing an organic-inorganic hybrid porous insulation coating composition having nano effects according to specific exemplary embodiments is described in more detail. It should be construed that these exemplary embodiments have been disclosed for illustrative purposes, and the present disclosure is not limited thereto. In addition, it is obvious to those skilled in the art that various modifications to the specific exemplary embodiments may be made within the scope of the present invention.

In addition, throughout the present specification, unless explicitly described to the contrary, "comprising", "including" or "containing" will be understood to imply the inclusion of any constituent elements (or components) without specific limitation and cannot be construed to exclude the addition of other constituent elements (or components).

In order to implement high breakdown voltage and coating adhesiveness to enameled winding wires used in a motor, a primary coating layer may be formed, and a secondary coating layer including inorganic particles such as spherical silicon may be formed. However, due to the phenomenon that silicon particles may not be well dispersed but may agglomerate in the organic material, the size of the particles may be increased and the particles may be exposed on a surface of the coating film. Accordingly, tertiary coating may be additionally performed, and accordingly, the thickness of the coating film is increased. In order to solve the increase in thickness, silicon spherical particles may be surface-treated with silane. However, an effect of the surface-treatment is not significant, such that the compatibility with the organic material is deteriorated, whereby dispersibility in the organic material is not good, coating adhesiveness with the copper conductor is deteriorated, and the breakdown voltage is deteriorated. Thus, the existing technologies have difficulties in increasing breakdown voltage while simultaneously having a thin thickness.

The present inventors found a method for preparing an organic-inorganic hybrid porous insulation coating material capable of remarkably improving breakdown voltage while simultaneously having a thin coating thickness, through surface treatment of nanosized sepiolite having a porous structure to provide excellent dispersibility in an organic material and to increase binding force with the organic material at the time of drying after coating.

In particular, according to an exemplary embodiment in the present disclosure, a coating composition may be prepared by adding sepiolite particles having a porous structure and being surface-treated with silane or dimethyl ammonium chloride in an organic material, rather than by adding the existing spherical silicon particle, followed by high-speed dispersion. By coating the coating composition on a copper wire conductor, it is possible to obtain a coating film in which the coating adhesiveness is improved as compared to the related art even without the primary coating layer used to improve the coating adhesiveness, and a thickness of the coating film is reduced by 44% as compared to the related art, and breakdown voltage is improved up to two times. In particular, the present disclosure incorporates sepiolite that is surface-treated, followed by high speed dispersion in the organic material, thereby being applied to winding wires for a motor/alternator, and has excellent effects in that breakdown voltage is capable of being remarkably improved while simultaneously reducing a thickness of the coating film.

Accordingly, according to an exemplary embodiment in the present disclosure, there is provided a method for preparing an organic-inorganic hybrid porous insulation coating composition having nano effects. The method for preparing an organic-inorganic hybrid porous insulation coating composition according to an exemplary embodiment in the present disclosure includes: adding sepiolite nanoparticles surface-treated with silane or dimethyl ammonium chloride into a thermal-resistant resin solution, followed by high-speed dispersion at 3600 rpm or more for 30 minutes or more, wherein the thermal-resistant resin solution includes at least one thermal-resistant resin selected from the group consisting of polyamide-imide, polyester, polyester-imide and polyamic acid.

The present disclosure relates to an insulating varnish, and enameled winding wires to which the insulating varnish is applied, etc., and specifically, relates to a method for preparing a coating composition including: surface-treating nano-sized sepiolite having a porous structure with silane or dimethyl ammonium chloride, followed by drying to obtain powder, and adding the dried powder in a resin solution in which polyamide-imide (PAI) or polyester-imide (PEI) or polyester (PE), etc., are mixed in solvents such as N-methylpyrrolidone (NMP), etc., followed by high-speed dispersion so as to disperse the sepiolite in the solution, and a technology for manufacturing a coating film in which the coating composition is coated on a metal wire such as copper and aluminum.

The coating film according to an exemplary embodiment has excellent electrical insulation, conductor close contacting property, and thermal resistance while having a thin thickness, thereby being applicable to components such as a motor, an alternator, a transformer, etc., and increasing integration of the enameled winding wires through thin-film and high insulation characteristics, such that current density is increased, whereby miniaturization of the components and high output are simultaneously achieved. In the existing technology, as a thickness is decreased, breakdown voltage is reduced, such that a technology of increasing breakdown voltage while decreasing the thickness of the coating film has been problematic. The present disclosure discloses a technology capable of solving this problem.

According to an exemplary embodiment in the present disclosure, the coating composition prepared by high-speed dispersing the sepiolite surface-treated in a polyamide-imide resin, etc., having high thermal resistance may be coated on the copper conductor, thereby manufacturing the enameled winding wires. As the enameled winding wires having the same structure as shown in FIG. 1, a single layered coating film having a thickness of 18 to 22 μm on copper having a conductor diameter of 1 mm may be manufactured. The coating film consists of sepiolite surface-treated with silane or dimethyl ammonium chloride in polyamide-imide, etc., that are enameled polymer, etc. The sepiolite used herein has a linear net structure formed of stacked talc plates and having magnesium-silicate combination and is porous to have a significantly large surface area. The sepiolite particle may have a specific surface area of 230 to 380 $m^2/g$, and may have a size of 50 to 500 nm. When surface-treating the surface with silane or dimethyl ammonium chloride, dispersibility is increased in the organic resin to remarkably improve electrical insulation, abrasion resistance, coating adhesiveness, and thermal resistance of the final coating film.

As the thermal-resistant resin which is a binder resin of the coating film at the time of manufacturing the enameled winding wires, any one or two or more of polyamide-imide, polyester, polyester-imide and polyamic acid may be mixed to be used. The thermal-resistant resin may have a resin solution form in which 15 to 45 wt % of the thermal-resistant resin is mixed in at least one organic solvent such as N-methylpyrrolidone (NMP) dimethyl formamide (DMF), dimethylacetamide (DMAc), cellusolves, glycols, ketones, etc., at the time of preparing the coating composition.

The present disclosure includes high-speed dispersion of the porous sepiolite nano particles in the thermal-resistant resin solution. In particular, when the sepiolite surface-treated with silane or dimethyl ammonium chloride is directly put into an organic solvent, the sepiolite may not be uniformly dispersed, but may rather sink below even though high-speed stirring is applied. The porous sepiolite nano particles having a content of 0.1 to 5 wt %, based on the weight of a solid content included in the solution, may be added in the thermal-resistant resin solution, followed by high-speed dispersion at 3600 rpm or more or at 3600 rpm to 15000 rpm for 30 minutes or more or for 30 minutes to 180 minutes.

In addition, there is a difference in miscibility with the resin according to a method for stirring the sepiolite surface-treated with silane or dimethyl ammonium chloride in a polyamide-imide (PAI) resin, etc. For example, when the sepiolite surface-treated with silane or dimethyl ammonium chloride is added in the polyamide-imide solution, followed by general stirring at less than 3600 rpm, or followed by synthetic stirring in which a ball-mill disperser is used and stirring is then performed at less than 3600 rpm, particles that are not uniformly dispersed may be observable to the naked eyes. Therefore, when the sepiolite surface-treated with silane or dimethyl ammonium chloride is directly put into a resin solution having a low viscosity such as polyamide-imide, etc., followed by stirring in a high-speed stirrer capable of providing high shear, the sepiolite may be uniformly and favorably dispersed in the solution, and dispersibility for a long period of time may be maintained.

Figure 2A:
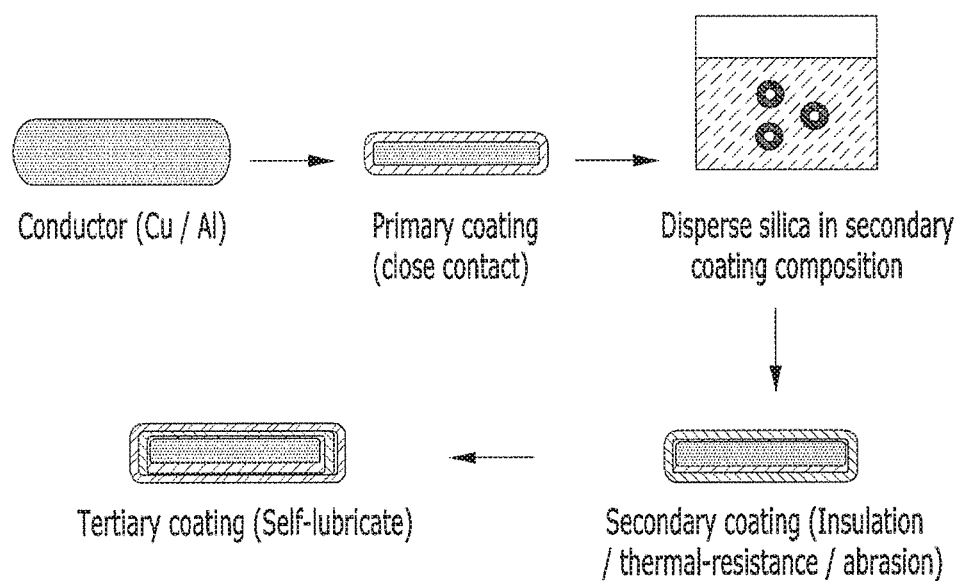
FIG. 2A is a process view showing a method for manufacturing an organic-inorganic hybrid coating film according to the related art.

As shown in FIG. 2A, in a method for manufacturing the organic-inorganic hybrid according to the related art manufactured by adding ceramic inorganic materials with polyester or polyester-imide or polyamide-imide, a manufacturing process for a multilayer structure is complicated (process as shown in FIG. 2A). In the existing technology, binding force between the inorganic materials and the organic materials and dispersibility in the organic materials of the inorganic materials are insufficient, and accordingly, when coating is directly performed on the conductor, coating adhesiveness between the conductor and the coating film is deteriorated. Therefore, primary coating is performed with materials having high coating adhesiveness, and then, a secondary coating in which the inorganic materials are dispersed in a middle layer is performed. In addition, tertiary coating is required, which is to cover a large surface roughness or a scratch caused on a surface due to insufficient dispersibility of the inorganic materials. In the case of the respective primary, secondary, and tertiary coatings, the number of times thereof is determined depending on coating with the number of micrometers (μm) for 1 pass and depending on characteristics to be required. Therefore, according to the manufacturing method utilizing the silica and other plate-shaped or spherical ceramics, the thickness of the coating film is increased, and the process is complicated.

Figure 2B:
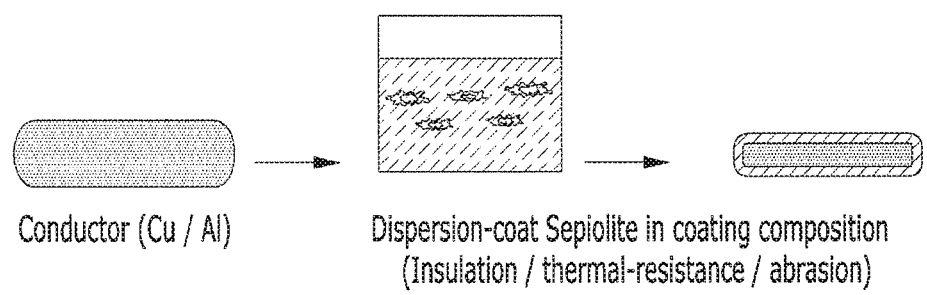
FIG. 2B is a process for manufacturing an organic-inorganic hybrid coating film according to an embodiment in the present disclosure.

In contrast, in the method for preparing the coating composition according to an exemplary embodiment in the present disclosure (process as shown in FIG. 2B), the sepiolite (for example, 0.5 wt %) surface-treated with silane or dimethyl ammonium chloride is directly put into a polyester or polyester-imide or polyamide-imide solution (for example, 30 wt %), and dispersed through a high-speed stirrer (about 3600 rpm or more for 30 minutes or more). The nanosized sepiolite having a porous structure is uniformly dispersed in a solution, and has excellent binding force with organic materials at the time of drying after coating, such that surface roughness is uniform and there is no scratch. In addition, the coating adhesiveness with the conductor is also excellent. Therefore, the primary coating process used for increasing adhesiveness and additionally performed tertiary coating processes are not required, such that efficiency of the entire process may be remarkably improved. By performing the coating once as described above, the coating film satisfying all of appearance, coating adhesiveness, electrical insulation property, thermal resistance, and abrasion resistance is capable of being manufactured, which is a large advantage that the coating film is capable of being thinly manufactured, and a large difference with the existing coating technology for enameled winding wires.

In addition, in the present disclosure, the nano-sized sepiolite having a porous structure is surface-treated to have excellent dispersibility in the organic materials and to increase binding force with the organic materials at the time of drying after coating. In particular, even though the sepiolite is added at a small content of about 0.1-5 wt %, breakdown voltage may be increased by two times or more, and coating adhesiveness with the conductor is excellent, such that a thickness of the final coating film may be thin. As described above, the sepiolite particles which are nano-sized porous ceramic materials may be used to remarkably increase breakdown voltage while having a thin coating thickness.

In the present disclosure, details other than the above-description is possibly added or subtracted as needed, and accordingly, the details are not specifically limited to those disclosed in the present disclosure.

According to an exemplary embodiment in the present disclosure, the sepiolite which is a nano-sized porous material is surface-treated with silane or dimethyl ammonium chloride, and added in the thermal-resistant resin solution such as polyamide-imide, etc., such that at the time of coating the prepared composition on a conductor such as copper or aluminum, coating film scratch resistance may be excellent, and a thin thickness may be implemented, and remarkably improved breakdown voltage may be secured, and a total coating process may be completed in a first stage, whereby there is an excellent effect in that it is possible to simplify entire process for manufacturing organic/inorganic hybrid enameled winding wires.

Hereinafter, Examples are presented in order to help a better understanding of the present disclosure, however, the following Examples are only illustrative, and do not limit the scope of the present disclosure.

Comparison Examples 1 to 11

Tests comparing the miscibility with a resin depending on stirring methods were conducted on the sepiolites surface-treated with silane or dimethyl ammonium chloride in a polyamide-imide (PAI) resin, etc., under conditions shown in Table 1 below.

For high-speed stirring, the following high-speed stirrer with a blade having the maximum RPM of 4500 was used to provide high shear of 18 m/s or more.

High-speed stirrer: 1 HP HOMOMIXER
Motor: Explosion proof 1 HP, AC Motor, 1Phase, 220V, 60 Hz
Impeller: Rotor & Stator, SUS316L
Clearance 0.2 mm When an NMP solvent was used, the NMP solvent was mixed with 1 wt % of the sepiolite surface-treated with silane or dimethyl ammonium chloride, on the basis of 100 wt % of PAI, followed by high-speed stirring at 3600 rpm or more for 30 minutes or more, or general stirring at 1000 rpm (the mixing amount is the same as above), or followed by synthetic stirring in which a ball-mill disperser is used and general stirring is then performed (the mixing amount is the same as above).

When the NMP is not separately used, the sepiolite surface-treated with silane or dimethyl ammonium chloride as 1 wt % part by weight of powder on the basis of 100 wt % of PAI was added, followed by high-speed dispersion.

TABLE 1

| | | | Sepiolite | | | |
| | Resin | Solvent | Surface Treatment | Added Amount | Solvency/ Miscibility | Stirring Method |
|---|---|---|---|---|---|---|
| Comparison Example 1 | PAI | — | — | — | Transparent | — |
| Comparison Example 2 | — | NMP | Silane | 1% of Solid | Layer Separation | High-Speed Stirring |
| Comparison Example 3 | — | NMP | Dimethyl Ammonium Chloride | 1% of Solid | Layer Separation | High-Speed Stirring |
| Comparison Example 4 | PAI | — | Silane | 1% of Solid | Transparent | High-Speed Stirring |
| Comparison Example 5 | PAI | — | Dimethyl Ammonium Chloride | 1% of Solid | Transparent | High-Speed Stirring |
| Comparison Example 6 | PAI | — | Silane | 1% of Solid | Seed was observed | General Stirring |
| Comparison Example 7 | PAI | — | Dimethyl Ammonium Chloride | 1% of Solid | Seed was observed | General Stirring |
| Comparison Example 8 | PAI | — | Silane | 1% of Solid | Transparent | Synthetic Stirring |
| Comparison Example 9 | PAI | — | Dimethyl Ammonium Chloride | 1% of Solid | Seed was observed | Synthetic Stirring |

As shown in Table 1 above, there is a difference in miscibility with the resin depending on the method for stirring the sepiolite surface-treated with silane or dimethyl ammonium chloride in a polyamide-imide (PAI) resin, etc. The existing polyamide-imide resin has a transparent state since there is no added material. On the contrary, when 1 wt % of sepiolite surface-treated with silane or dimethyl ammonium chloride was added in the polyamide-imide solution, followed by general stirring at about 1000 rpm, particles that were not uniformly dispersed were observable to the naked eye. Further, even in the case of synthetic stirring in which the ball-mill disperser is used and stirring is then performed at about 1000 rpm, when the sepiolite was surface-treated with silane, the sepiolite particles were not observable to the naked eye, and there was no layer separation; however, when the sepiolite was surface-treated with dimethyl ammonium chloride, the sepiolite particles were observable to the naked eye.

Accordingly, it may be appreciated that when high-speed stirring at 3600 rpm or more for 30 minutes or more was performed, particles of both sepiolites surface-treated with silane or dimethyl ammonium chloride were uniformly dispersed in the polyamide-imide solution.

Example 1

In the same manner as shown in FIG. 2B, the sepiolite (average particle size of 50 to 500 nm) coated with dimethyl ammonium chloride was added in a solution in which 30 wt % of polyamide-imide was polymerized in an NMP solvent, wherein the sepiolite had a content of 0.5 wt %, based on the weight of a solid content included in the solution, followed by high-speed dispersion, thereby preparing a coating composition.

The coating composition prepared as above was coated at a thickness of 18 μm on a copper conductor having a diameter of 1 mm, thereby manufacturing enameled copper wires on which a coating film was formed.

Example 2

In the same manner as shown in FIG. 2B, the sepiolite (average particle size of 50 to 500 nm) coated with silane was added in a solution in which 30 wt % of polyamide-imide was polymerized in an NMP solvent, wherein the sepiolite had a content of 0.5 wt % of a solid, followed by high-speed dispersion at 3600 rpm or more for 30 minutes or more, thereby preparing a coating composition.

The coating composition prepared as above was coated at a thickness of 18 μm on a copper conductor having a diameter of 1 mm, thereby manufacturing enameled copper wires on which a coating film was formed.

Example 3

As shown in Table 2 below, a coating composition was prepared in the same manner as Example 2 above except for adding the sepiolite coated with silane in a content of 1 wt % of a solid.

The coating composition prepared as above was coated at a thickness of 18 μm on a copper conductor having a diameter of 1 mm, thereby manufacturing enameled copper wires on which a coating film was formed.

Comparative Example 1

In the existing manner as shown in FIG. 2A, polyamide-imide was coated at a thickness of 32 μm on a copper conductor having a diameter of 1 mm without adding separate inorganic materials, thereby manufacturing enameled copper wires on which a coating film was formed.

Comparative Example 2

Enameled copper wires were manufactured in the same manner as Example 2 above except for performing general stirring at about 1000 rpm after the sepiolite coated with silane was added.

Experimental Example

Evaluations comparing the coating adhesiveness and breakdown voltage were conducted on the enameled copper wires manufactured by Examples 1 to 3 and Comparative Examples 1 and 2 according to the following methods.

Adhesiveness Property

An adhesiveness force test was conducted under harsher conditions than conditions of the existing KS C 3107 coating film scratch resistance and coating adhesiveness tests. After the wires were stretched by 20%, 25%, and 30%, respectively, the number of scratches on a surface caused when winding the wires around a mandrel having a diameter twice that of a conductor diameter were measured. The harsh test condition evaluates flexibility and adhesiveness of the coating film even though the inorganic materials were added.

Breakdown Voltage

Evaluation for breakdown voltage was conducted according to KS C 3600 standard.

Constitution of the enameled copper wires manufactured by Examples 1 to 3 and Comparative Examples 1 and 2, and evaluation results of physical properties thereof were shown in Table 2 below:

TABLE 2

|  |  | Comparative Example 1 | Example 1 | Example 2 | Example 3 | Comparative Example 2 |
|---|---|---|---|---|---|---|
|  | Conductor | Copper | Copper | Copper | Copper | Copper |
|  | Base Coating Composition | PAI | PAI | PAI | PAI | PAI |
| Mixing Inorganic Material | Kind | — | Sepiolite Surface-treated with Dimethyl Ammonium Chloride | Sepiolite Surface-treated with Silane | Sepiolite Surface-treated with Silane | Sepiolite Surface-treated with Silane |
|  | Added Amount | — | 0.5% of Solid | 0.5% of Solid | 1% of Solid | 0.5% of Solid |
|  | Stirring Speed (rpm) | 1000 | 3600 or more | 3600 or more | 3600 or more | 1000 |

TABLE 2-continued

| | | Comparative Example 1 | Example 1 | Example 2 | Example 3 | Comparative Example 2 |
|---|---|---|---|---|---|---|
| Coating Appearance | Flux (14 m/min) | Excellent | Excellent | Excellent | Excellent | Excellent |
| | Coating Film Thickness (one side) (mm) | 0.032 | 0.018 | 0.018 | 0.018 | 0.032 |
| Adhesiveness Test (10 turns) | 20%, 2D (2 mm), 10 turns | 0 | 0 | 0 | 0 | 2 |
| | 25%, 2D (2 mm), 10 turns | 1 | 0 | 1 | 2 | 2 |
| | 30%, 2D (2 mm), 10 turns | 3 | 0 | 2 | 7 | 10 |
| | Breakdown voltage (V) | 1500 | 2500 | 2250 | 4000 | 1000 |

PAI: Polyamide-imide
In Examples 1 to 3, high-speed stirring of inorganic material is applied.

Figure 3:
FIG. 3 is images of appearances of mixing resins prepared by Example 1 and Comparative Example 1, and enameled winding wires (Comparative Example 1: PAI (Related Art), Example 1: PAI+Sepiolite 0.5 wt %).
Figure 3:
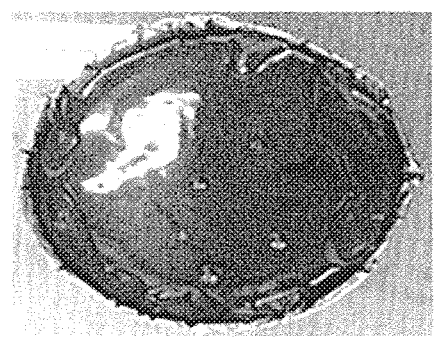
Figure 3:
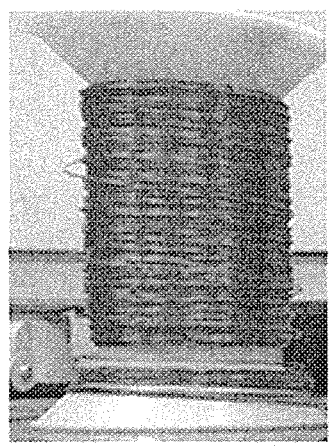
Figure 3:
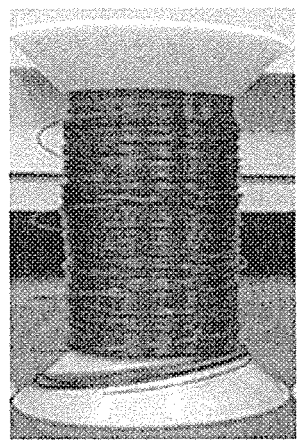
Figure 3:
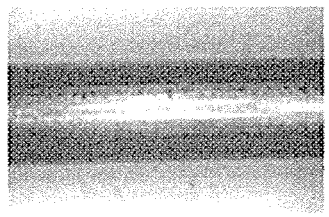
Figure 3:
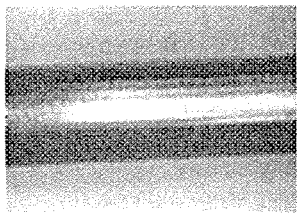
Figure 4:
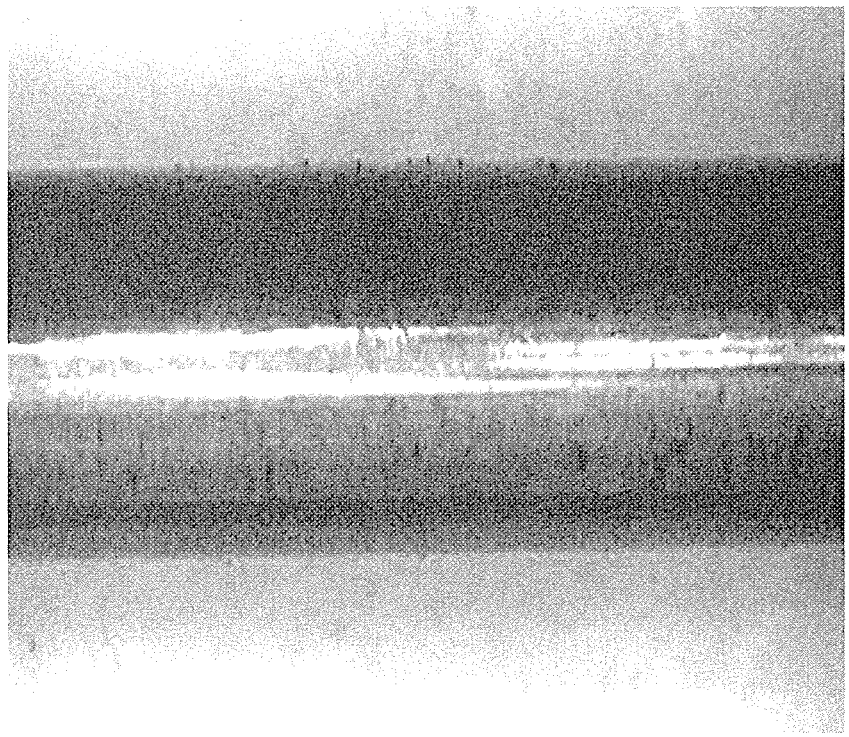
FIG. 4 is an image showing enameled winding wires manufactured by Comparative Example 2.

FIG. 3 shows appearances of mixing resins prepared by Example 1 and Comparative Example 1, and enameled winding wires (Comparative Example 1: PAI (Related Art), Example 1: PAI+Sepiolite 0.5 wt %), and FIG. 4 is an image showing the enameled winding wires manufactured by Comparative Example 2. It may be appreciated from FIG. 3 that, as compared to Comparative Example 1 in which the resin solution was merely treated, the enameled winding wires of Example 1 had excellent gloss of the same appearance performance, excellent surface roughness, and excellent coating film scratch resistance. In particular, when observing the appearance of the mixing resin obtained by adding 0.5 wt % of the sepiolite surface-treated with dimethyl ammonium chloride in 30 wt % of the polyamide-imide solution, followed by high-speed dispersion according to Example 1, transparency as the same as the existing polyamide-imide resin was maintained, and the sepiolite particles were not observable to the naked eye. In addition, it may be appreciated that even when manufacturing the enameled winding wires by coating using this solution, evaluation conditions in view of appearance such as gloss, surface roughness, coating film scratch resistance, etc., were equally satisfied as compared to when the existing polyamide-imide coating was performed. It may also be appreciated that the enameled winding wires of Comparative Example 2 shown in FIG. 4 were not subjected to high-speed stirring, such that the enameled winding wires had a rough surface, and scratch occurred.

Further, as shown in Table 2 above, it may be appreciated that the enameled copper wires of Examples 1 to 3 manufactured by high-speed dispersing the surface-treated sepiolite in the organic material coating composition according to an exemplary embodiment in the present disclosure had significantly excellent coating adhesiveness even at a thin thickness without a primary coating layer, and also had remarkably improved breakdown voltage. In particular, in the polyamide-imide enameled winding wires of Example 1 manufactured by dispersing 0.5 wt % sepiolite surface-treated with dimethyl ammonium chloride appearance was clean, and scratch was hardly shown in all of 20%, 25%, and 30% stretches in close contacting property test, and breakdown voltage was high as 2500V. On the contrary, in the polyamide-imide enameled winding wires of Comparative Example 1 manufactured by not adding mixing inorganic materials according to the existing manner, coating appearance was clean, and scratch was once observed in 25% stretch and scratches were observed three times in 30% stretch in close contacting property test, and breakdown voltage was merely 1500V. Further, it may be confirmed in Comparative Example 2 manufactured by adding the sepiolite according to the existing manner that scratches were observed twice in each of 20% and 25% stretches, and scratches were observed 10 times in 30% stretch, such that close contacting property was remarkably deteriorated, and breakdown voltage was merely 1000V.

Therefore, it may be appreciated that the enameled copper wires of Examples 1 to 3 in which the coating film was formed by using the coating composition prepared by adding sepiolite particles having a porous structure and being surface-treated with silane or dimethyl ammonium chloride in an organic material, rather than adding the existing spherical silicon particle, followed by high-speed dispersion had excellent close contacting property, and improved breakdown voltage up to 4 times while simultaneously having a thin thickness corresponding to 44% as compared to the enameled copper wire of Comparative Example 1 manufactured by using the existing material.

While this invention has been described in connection with what is presently considered to be practical exemplary embodiments, it is to be understood that the invention is not limited to the disclosed embodiments, but, on the contrary, is intended to cover various modifications and equivalent arrangements included within the spirit and scope of the appended claims.

What is claimed is:

1. A method for preparing an organic-inorganic hybrid porous insulation coating composition comprising steps of:
    adding sepiolite nanoparticles that have been surface-treated with silane or dimethyl ammonium chloride to a thermal-resistant resin solution; and
    stirring the thermal-resistant resolution solution containing the sepiolite nanoparticles at 3600 rpm or more for 30 minutes or more,
    wherein the thermal-resistant resin solution includes at least one thermal-resistant resin selected from the group consisting of polyamide-imide, polyester, polyester-imide and polyamic acid, and
    the sepiolite nanoparticles are added in a content of 0.1 to 5 wt %, based on a total weight of a solid included in the solution.

2. The method of claim 1, wherein the sepiolite nanoparticle has a specific surface area of 230 to 380 $m^2/g$.

3. The method of claim 1, wherein the sepiolite nanoparticle has a size of 50 to 500 nm.

4. The method of claim 1, wherein the thermal-resistant resin solution includes the thermal-resistant resin in a content of 15 to 45 wt %, based on a total weight of the thermal-resistant resin solution.

5. The method of claim 1, wherein the thermal-resistant resin solution includes at least one organic solvent selected from the group consisting of N-methylpyrrolidone (NMP), dimethyl formamide (DMF), dimethylacetamide (DMAc), cellusolves, glycols, and ketones.

* * * * *